: US 11,829,567 B2
(12) United States Patent
Liu et al.

(10) Patent No.: US 11,829,567 B2
(45) Date of Patent: Nov. 28, 2023

(54) TOUCH PAD, FORCE TOUCH APPARATUS, AND ELECTRONIC DEVICE

(71) Applicant: SHENZHEN GOODIX TECHNOLOGY CO., LTD., Shenzhen (CN)

(72) Inventors: Wu Liu, Shenzhen (CN); Rong Zhang, Shenzhen (CN); Shengbin Zhang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/986,482

(22) Filed: Nov. 14, 2022

(65) Prior Publication Data

US 2023/0341980 A1    Oct. 26, 2023

(30) Foreign Application Priority Data

Apr. 20, 2022   (CN) .......................... 202220915218.X

(51) Int. Cl.
  *G06F 3/044*   (2006.01)
  *G06F 3/041*   (2006.01)
(52) U.S. Cl.
  CPC .......... *G06F 3/0445* (2019.05); *G06F 3/0416* (2013.01); *G06F 2203/04105* (2013.01)
(58) Field of Classification Search
  CPC ................. G06F 3/0445; G06F 3/0416; G06F 2203/04105; G06F 1/169
  See application file for complete search history.

(56) References Cited

U.S. PATENT DOCUMENTS

| 2018/0081483 A1* | 3/2018 | Camp ..................... G06F 3/016 |
| 2018/0218859 A1* | 8/2018 | Ligtenberg ............ G06F 3/0414 |
| 2019/0339776 A1* | 11/2019 | Rosenberg .............. G06F 3/045 |

FOREIGN PATENT DOCUMENTS

| JP | 2018112854 A | 7/2018 |
| JP | 2019125218 A | 7/2019 |
| KR | 20210022376 A | 3/2021 |
| WO | WO2015093030 A1 | 3/2017 |

* cited by examiner

*Primary Examiner* — Temesghen Ghebretinsae
*Assistant Examiner* — Ivelisse Martinez Quiles
(74) *Attorney, Agent, or Firm* — Emerson, Thomson, & Bennett, LLC; Roger D. Emerson; Matt J. Wilson

(57) ABSTRACT

A touch pad including a touch sensor, a force sensor, a printed circuit board, and a touch controller is provided. The touch sensor includes first and second touch electrode layers, and a first substrate. The first touch electrode layer is arranged above the second touch electrode layer through the first substrate. The force sensor is arranged below the touch sensor, and includes a support structure and at least one pressure electrode layer. The support structure is a deformable structure, and is configured to deform under the action of a pressure applied by a finger when pressing the touch pad to change a pressure sensing capacitance of a finger pressing region, and output a corresponding pressure sensing signal through the at least one pressure electrode layer. The printed circuit board is arranged below the force sensor. The touch controller is mounted and fixed to the printed circuit board.

17 Claims, 8 Drawing Sheets

TOUCH PAD, FORCE TOUCH APPARATUS, AND ELECTRONIC DEVICE

CROSS-REFERENCE TO RELATED APPLICATION

This application claims priority to the Chinese Patent Application No. 202220915218.X, filed on Apr. 20, 2022 and entitled "TOUCH PAD, FORCE TOUCH APPARATUS, AND ELECTRONIC DEVICE", the disclosures of which is hereby incorporated by reference in its entirety.

TECHNICAL FIELD

Embodiments of the present disclosure relate to the technical field of electronics, and in particular to, a touch pad, a pressure touch apparatus, and an electronic device.

BACKGROUND

A touch pad is often used in an electronic device such as a notebook computer, and is mainly used to sense the position and movement of a user's finger by using a touch sensor, and control the movement of a pointer on a display interface of the electronic device. A conventional touch pad uses a physical dome key to detect a user's pressing action, to execute a function, such as confirmation or invoking a menu. However, the user's pressing action can only be executed in a local area where the physical dome key of the touch pad is located, and cannot be executed in any area of the whole touch pad.

The pressure touch pad realizes operations such as confirmation and invoking a menu using pressure detection instead of physical dome key detection, thereby solving the problem that the conventional touch pad can only be locally pressed. The pressure touch pad can adjust the response strength and vibration feedback strength of the user's pressing action based on the user's use habits, thereby providing users with a more convenient and comfortable operating experience. The quality of the user experience largely depends on the structural design of the touch pad.

Therefore, how to improve the pressure detection performance of the touch pad to improve the user experience has become a to-be-solved problem.

SUMMARY OF THE UTILITY MODEL

In view of this, the present disclosure provides a touch pad, a pressure touch apparatus, and an electronic device, where the touch pad has the performances of low costs, small thickness, and high pressure detection sensitivity.

In a first aspect, a touch pad is provided, including a touch sensor, a force sensor, a printed circuit board, and a touch controller; where the touch sensor includes a first touch electrode layer, a second touch electrode layer, and a first substrate; the first touch electrode layer is arranged above the second touch electrode layer through the first substrate, and forms a plurality of touch sensing capacitors with the second touch electrode layer; and the touch sensing capacitors are configured to, when a finger touches or presses the touch pad, sense a touch position of the finger and output a corresponding touch sensing signal; the force sensor is arranged below the touch sensor, and includes a support structure and at least one pressure electrode layer; the at least one pressure electrode layer is configured to form a plurality of pressure sensing capacitors below the touch sensor; and the support structure is a deformable structure, and is configured to deform under the action of a pressure applied by the finger when pressing the touch pad to change a pressure sensing capacitance of a finger pressing region, and output a corresponding pressure sensing signal through the at least one pressure electrode layer; the printed circuit board is arranged below the force sensor, and is configured to carry and support the force sensor and the touch sensor; and the touch controller is mounted and fixed to the printed circuit board, is electrically connected to the touch sensor and the force sensor, and is configured to receive the touch sensing signal from the touch sensor and the pressure sensing signal from the force sensor, and determine the touch position of the finger on the touch pad and a magnitude of the pressure applied by the finger.

The touch pad provided in the present disclosure is provided with the force sensor below the touch sensor, and the force sensor forms a pressure sensing capacitor between pressure electrode layers using the support structure, thereby detecting the magnitude of the pressure applied by the finger when pressing the touch pad in a pressure-capacitance manner. Compared with a conventional touch pad using a piezoresistive force sensor, the touch pad provided in the present embodiment is cheap with a simple structure, further has the effects of small thickness and high pressure detection sensitivity, and may be adapted to electronic devices in different application scenarios.

In a possible implementation, the first touch electrode layer is formed on an upper surface of the first substrate, and the second touch electrode layer is formed on a lower surface of the first substrate; or the touch sensor further includes a second substrate, where the first touch electrode layer is formed on the upper surface of the first substrate, and the second touch electrode layer is formed on an upper surface of the second substrate, and the first substrate is fixedly bonded to the second substrate with an adhesive glue.

In a possible implementation, the at least one pressure electrode layer includes a first pressure electrode layer and a second pressure electrode layer, the first pressure electrode layer and the second pressure electrode layer are arranged on both sides of the support structure to form the plurality of pressure sensing capacitors, the support structure is configured to form a variable gap between the first pressure electrode layer and the second pressure electrode layer, and a width of the variable gap is changed under the action of the pressure applied by the finger to change the pressure sensing capacitance of the finger pressing region.

In a possible implementation, the first pressure electrode layer is arranged above the support structure, and includes an upper electrode sublayer and an upper substrate sublayer, where the upper electrode sublayer is carried on an upper surface of the upper substrate sublayer and has a plurality of spaced pressure driving electrodes; and the second pressure electrode layer is arranged below the support structure and includes a lower electrode sublayer and a lower substrate sublayer, where the lower electrode sublayer is carried on an upper surface of the lower substrate sublayer and includes a plurality of spaced pressure sensing electrodes.

In a possible implementation, the support structure includes first support bodies, a flexible film layer, and second support bodies, the first support bodies are distributedly disposed on an upper surface of the flexible film layer, and the second support bodies are distributedly disposed on a lower surface of the flexible film layer; where the first support bodies are configured to support the first pressure electrode layer, the second support bodies are connected to the second pressure electrode layer, and the first support bodies and the second support bodies are arranged in a staggered manner on horizontal projection of the flexible film layer.

In a possible implementation, the second touch electrode layer of the touch sensor is multiplexed by the force sensor for use as a common electrode layer; the at least one pressure electrode layer is the second pressure electrode layer located below the support structure; and the second pressure electrode layer and the common electrode layer overlap each other to form the plurality of pressure sensing capacitors.

In a possible implementation, the second pressure electrode layer includes a lower electrode sublayer, and the lower electrode sublayer is directly formed on an upper surface of the printed circuit board; or the second pressure electrode layer includes a lower electrode sublayer and a lower substrate sublayer, where the lower electrode sublayer is formed on an upper surface of the lower substrate sublayer, and the lower substrate sublayer is arranged on a surface of the printed circuit board.

In a possible implementation, the support structure is arranged between the second touch electrode layer and the second pressure electrode layer, and is configured to form a variable gap between the second touch electrode layer and the second pressure electrode layer, where a width of the variable gap is changed under the action of the pressure applied by the finger to change the pressure sensing capacitance of the finger pressing region.

In a possible implementation, the support structure includes first support bodies, a flexible film layer, and second support bodies, the first support bodies are distributedly disposed on an upper surface of the flexible film layer, and the second support bodies are distributedly disposed on a lower surface of the flexible film layer, where the first support bodies are configured to support the common electrode layer, and the second support bodies are connected to the second pressure electrode layer to support the flexible film layer above the second pressure electrode layer; where the second support bodies are directly connected to the second pressure electrode layer with an adhesive glue, or the second support bodies are indirectly connected to the second pressure electrode layer through a flat layer.

In a possible implementation, the first support bodies are first hard particles uniformly distributed in a matrix form on the upper surface of the flexible film layer, the second support bodies are second hard particles uniformly distributed in a matrix form on the lower surface of the flexible film layer, and the first support bodies and the second support bodies are arranged in a staggered manner on horizontal projection of the flexible film layer.

In a possible implementation, the first hard particles and the second hard particles are all round particles, and have different diameters; where a diameter of each of the first support bodies is at least three times as long as a diameter of each of the second support bodies, or the diameter of each of the first support bodies ranges from one half to one third of the diameter of each of the second support bodies.

In a possible implementation, the first support bodies and the second support bodies are integrally formed with the flexible film layer or are closely fixed to the upper surface and the lower surface of the flexible film layer with an adhesive glue, where a center of a region defined by any four adjacent second support bodies is provided with one first support body, and a size of the first support body is larger than a size of one of the four adjacent second support bodies.

In a possible implementation, the common electrode layer, as a common driving electrode layer of the touch sensor and the force sensor, includes a plurality of common driving electrodes; the first touch electrode layer includes a plurality of touch sensing electrodes arranged above the common electrode layer, and the second pressure electrode layer includes a plurality of pressure sensing electrodes arranged below the common electrode layer, where the common driving electrodes are configured to receive a driving signal from the touch controller, and the touch sensing electrodes and the pressure sensing electrodes are configured to respond to the driving signal and output the touch sensing signal and the pressure sensing signal, respectively.

In a possible implementation, the touch sensing electrodes and the pressure sensing electrodes are configured to respond to a common driving signal sent from the touch controller at a same moment, and output the touch sensing signal and the pressure sensing signal, respectively.

In a possible implementation, the driving signal outputted from the touch controller to the common driving electrodes includes a touch driving signal outputted at a first moment and a pressure driving signal outputted at a second moment, the touch sensing electrodes are configured to respond to the touch driving signal and output the touch sensing signal to the touch controller, and the pressure sensing electrodes are configured to respond to the pressure driving signal, and output the pressure sensing signal to the touch controller.

In a possible implementation, the touch pad further includes: an actuator mounted on a lower surface of the printed circuit board, electrically connected to the touch controller, and configured to provide vibration feedback in response to the magnitude of the pressure applied by the finger; and a bracket configured to support the printed circuit board and mount the touch pad to an outer casing, where the bracket covers the lower surface of the printed circuit board and has a plurality of openings, where the plurality of openings is configured to accommodate the touch controller and the actuator respectively, and provide an avoidance space for the touch controller and the actuator.

In a possible implementation, the actuator includes four piezoelectric ceramic actuators arranged in four corner regions of the lower surface of the printed circuit board respectively, and configured to vibrate in a direction perpendicular to the printed circuit board; and the bracket is formed with four openings in four corner regions thereof to accommodate the four piezoelectric ceramic actuators, and is formed with a center opening in a middle region to accommodate the touch controller; or the actuator includes a linear motor arranged in a middle region of the lower surface of the printed circuit board, the linear motor is configured to vibrate in a direction parallel to the printed circuit board; and the bracket is formed with a middle opening in the middle region thereof to accommodate the linear motor, and is formed with a first opening and a second opening on both sides of the middle opening respectively to accommodate the touch controller and other electronic components.

In a second aspect, a touch pad is provided, including: a touch sensing electrode layer including a plurality of touch sensing electrodes spaced apart from each other; a common electrode layer arranged below the touch sensing electrode layer, and including a plurality of common driving electrodes spaced apart from each other, where a plurality of touch sensing capacitors is formed between the common driving electrodes and the touch sensing electrodes, and the plurality of touch sensing capacitors is used as touch sensors and is configured to, when a finger touches or presses the touch pad, sense a touch position of the finger and output a corresponding touch sensing signal; a pressure sensing electrode layer arranged below the common electrode layer, and including a plurality of pressure sensing electrodes spaced apart from each other, where a plurality of pressure sensing capacitors is formed between the pressure sensing electrodes and the common driving electrodes, and the plurality of pressure sensing capacitors is used as force sensors, and is configured to detect a magnitude of a pressure applied by the finger when pressing the touch pad; and a printed circuit board configured to carry the pressure sensing electrode layer, where the pressure sensing electrode is formed on a surface of the printed circuit board; where a support structure is arranged between the common electrode layer and the pressure sensing electrode layer, and the support structure is a deformable structure, and is configured to deform under the action of the pressure applied by the finger to change a pressure sensing capacitance of a finger pressing region.

In a possible implementation, the support structure includes first support bodies, a flexible film layer, and second support bodies, where the first support bodies are distributedly disposed on an upper surface of the flexible film layer, and are configured to support the common electrode layer; and the second support bodies are distributedly disposed on a lower surface of the flexible film layer, and are configured to support the flexible film layer above the pressure sensing electrode layer.

In a possible implementation, the first support bodies are first hard particles uniformly distributed in a matrix form on the upper surface of the flexible film layer, the second support bodies are second hard particles uniformly distributed in a matrix form on the lower surface of the flexible film layer, the first hard particles and the second hard particles are of different sizes, and the first support bodies and the second support bodies are arranged in a staggered manner on horizontal projection of the flexible film layer.

In a possible implementation, the touch pad further includes a touch controller, where the touch controller is mounted on a lower surface of the printed circuit board, and is configured to output a driving signal to the common driving electrodes, and receive a touch sensing signal outputted from the touch sensing electrode and a pressure sensing signal outputted from the pressure sensing electrode in response to the driving signal, where the touch sensing signal is used to detect the touch position of the finger, and the pressure sensing signal is used to detect the magnitude of the pressure applied by the finger.

In a possible implementation, the driving signal is a common driving signal outputted from the touch controller at a same moment, and the touch sensing electrodes and the pressure sensing electrodes are configured to respond to the common driving signal and output the touch sensing signal and the pressure sensing signal respectively; or the driving signal outputted from the touch controller to the common driving electrodes includes a touch driving signal outputted at a first moment and a pressure driving signal outputted at a second moment, the touch sensing electrodes are configured to respond to the touch driving signal and output the touch sensing signal to the touch controller, and the pressure sensing electrodes are configured to respond to the pressure driving signal, and output the pressure sensing signal to the touch controller.

In a possible implementation, the touch pad further includes: an actuator mounted on a lower surface of the printed circuit board, electrically connected to the touch controller, and configured to provide vibration feedback in response to the magnitude of the pressure applied by the finger; and a bracket configured to support the printed circuit board and mount the touch pad to an outer casing, where the bracket covers the lower surface of the printed circuit board and has a plurality of openings, where the plurality of openings is configured to accommodate the touch controller and the actuator respectively, to provide an avoidance space for the touch controller and the actuator.

In a third aspect, a pressure touch apparatus is provided, including a cover plate configured to provide an input interface for a touch or press of a finger; a touch sensor arranged below the cover plate, and configured to sense a touch position of the finger when the finger touches or presses the cover plate, and output a corresponding touch sensing signal; a force sensor arranged below the touch sensor, and includes a support structure and at least one pressure electrode layer; where the at least one pressure electrode layer is configured to form a plurality of pressure sensing capacitors below the touch sensor; and the support structure is a deformable structure, and is configured to deform under the action of a pressure applied by the finger when pressing the pressure touch apparatus to change a pressure sensing capacitance of a finger pressing region; a printed circuit board arranged below the force sensor, and configured to carry and support the force sensor and the touch sensor; and a touch controller mounted and fixed to the printed circuit board, electrically connected to the touch sensor and the force sensor, and configured to receive the touch sensing signal from the touch sensor and the pressure sensing signal from the force sensor, and determine the touch position of the finger on the pressure touch apparatus and a magnitude of the pressure applied by the finger.

In a fourth aspect, an electronic device is provided, including a displayer and the touch pad according to the first aspect, possible implementations in the first aspect, the second aspect, or possible implementations in the second aspect, where the touch pad is configured to, when a finger touches or presses the touch pad, detect a touch position of the finger and a magnitude of a pressure applied by the finger, and the displayer is configured to display an operation related to the touch or press of the finger.

DETAILED DESCRIPTION OF EMBODIMENTS

Technical solutions in embodiments of the present disclosure will be described below with reference to the accompanying drawings.

Figure 1:
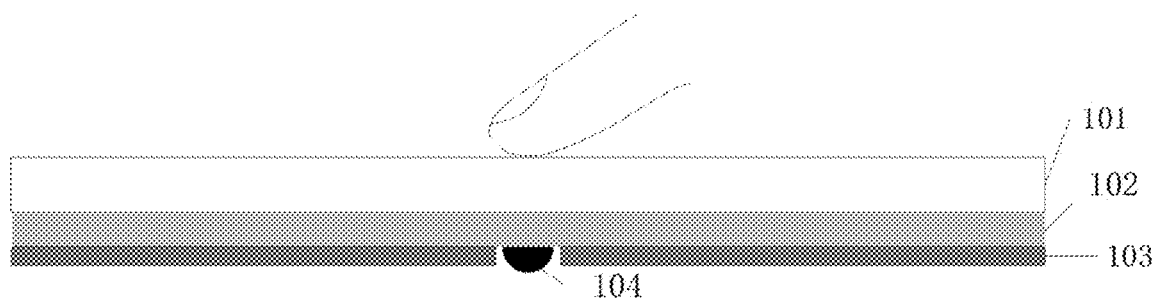
FIG. 1 is a schematic diagram of a laminated structure of a typical touch pad supporting dome key functions.

As a common finger touch input apparatus, a touch pad is widely used in notebook computers or other electronic devices. A conventional touch pad usually only supports a finger touch function. A laminated structure of a typical notebook touch pad as shown in FIG. 1 includes a cover plate 101, a touch sensor 102, and a bracket 103 successively arranged from top to bottom. The cover plate 101 functions for protection, the touch sensor 102 is configured to detect a touch position of a finger, and the bracket 103 is configured to fix the touch pad to a whole notebook computer. The cover plate 101, the touch sensor 102, and the bracket 103 are bonded with a fixing glue. A dome key 104 is affixed below the touch sensor 102. The dome key 104 is a physical entity key for detecting a pressing action of a finger on an upper surface of the cover plate 101. The function of the dome key 104 is similar to that of a left button or a right button of a mouse.

In order to enrich application scenarios of notebook touch pads, another typical notebook touch pad uses a pressure detection function to detect the pressing of the above entity keys, and uses vibration feedback to provide a tactile hand-feel after pressing and unpressing. Compared with entity keys, the pressure detection and tactile feedback have small pressing strokes and clearer feedback, and can expand some other abundant application scenarios.

The pressure detection may be implemented by a piezoresistive force sensor, which may be in a structure of a strain gauge and a cantilever beam; the pressure applied by the finger when pressing the touch pad may be transmitted to the strain gauge through the cantilever beam, thus making the strain gauge be deformed, then changing the resistance value, and computing a magnitude of the pressure based on the resistance value changes. However, the piezoresistive force sensor solution has a large overall thickness with a very difficult process, so that the application scenarios may have some limitations.

The embodiments of the present disclosure provide a touch pad, which may be applied to a notebook computer to support pressure detection, and is mainly used to detect the magnitude of the pressure based on capacitance changes between electrodes. The touch pad has the advantages of low costs, small thickness, and high pressure detection sensitivity, and further, the touch pad provided in the embodiments of the present disclosure may also have a tactile feedback function.

It should be understood that, in addition to notebook computers, the technical solutions in the embodiments of the present disclosure can be applied to a portable computing device such as a smart phone, a tablet computer, or a game device, or other electronic devices.

Figure 2:
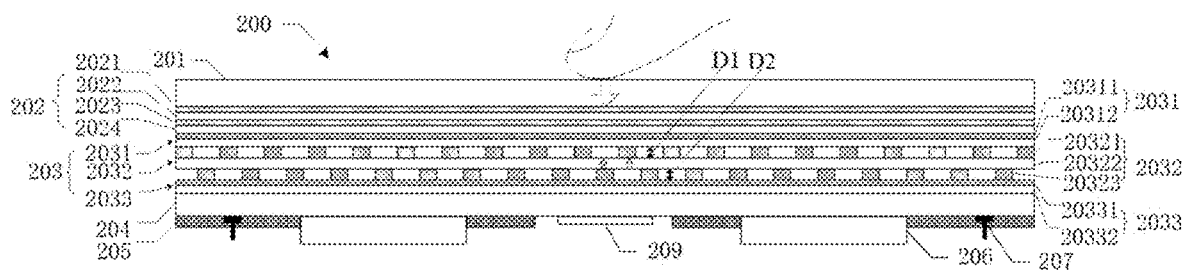
FIG. 2 is a schematic diagram of a laminated structure of a touch pad in an embodiment of the present disclosure.

FIG. 2 is a schematic structural diagram of a touch pad in an embodiment of the present disclosure. The touch pad 200 may be used as a pressure touch apparatus of an electronic device, and includes a cover plate 201, a touch sensor 202, a force sensor 203, a printed circuit board (PCB) 204, and a bracket 205 that are successively arranged from top to bottom.

The cover plate 201 may specifically be a glass cover plate or other protective cover plates, and is mainly configured to provide an input surface for finger touch or pressing, and protect the touch sensor 202 and the force sensor 203 below. In terms of specific operations, a user may touch or move the input surface provided by the cover plate 201 with a finger to control an electronic device to execute instructions related to the touch operation or to move a pointer on a display interface of the electronic device. Further, when touching or moving the cover plate 201, the finger may press the cover plate 201 synchronously to apply a downward pressure to the touch pad 200, to control the electronic device to execute instructions related to the pressing operation. It should be understood that while a glass cover plate or a protective cover plate is used as an example in the present embodiment, in some specific application scenarios, the cover plate 201 may further be other functional components of the electronic device, such as a component with a display function.

The touch sensor 202 is mainly configured to detect a touch position of the finger on the cover plate 201 and movement thereof on the cover plate 201, and output coordinate information of the touch position of the finger or dynamic vector information generated by the finger movement to a master controller of the electronic device. In an embodiment, the touch sensor 202 includes a first touch electrode layer 2021, a first substrate 2022, a second touch electrode layer 2023, and a second substrate 2024 successively from top to bottom, where the first touch electrode layer 2021 may include a horizontal electrode arranged on an upper surface of the first substrate 2022, and the second touch electrode layer 2023 may include a longitudinal electrode arranged on an upper surface of the second substrate 2024. In the present embodiment, assuming that the touch pad is a rectangular touch pad, of which a horizontal direction and a longitudinal direction may be defined as a length direction and a width direction of the rectangular touch pad 200, respectively, i.e., the first touch electrode layer 2021 is an electrode layer integrally extending along the length direction of the rectangular touch pad 200, and the second touch electrode layer 2023 is an electrode layer integrally extending along the width direction of the rectangular touch pad 200.

The cover plate 201, the first substrate 2022, and the second substrate 2024 are fixedly bonded with an adhesive glue, such that the first touch electrode layer 2021 is located between the cover plate 201 and the first substrate 2022, the second touch electrode layer 2023 is located between the first substrate 2022 and the second substrate 2024, the first substrate 2022 provides support for the first touch electrode layer 2021, and the second substrate 2024 provides support for the second touch electrode layer 2023. In a specific embodiment, the first substrate 2022 and the second substrate 2024 may be a film, for example, a film formed by a PET substrate, a PC substrate, or a hybrid substrate of the two substrates. A film is as used a substrate of the touch sensor 202, thereby contributing to reducing the thickness of the touch pad. In other alternative embodiments, the first substrate 2022 and the second substrate 2024 may also be a flexible printed circuit board (FPC), a PCB, a metal sheet, or the like.

Figure 3A:
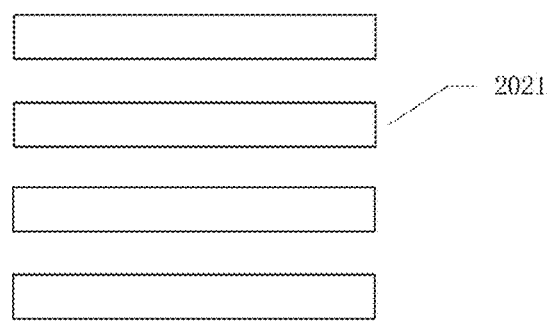
FIG. 3a and FIG. 3b are schematic diagrams of electrode patterns of a touch sensor of the touch pad shown in FIG. 2.
Figure 3B:
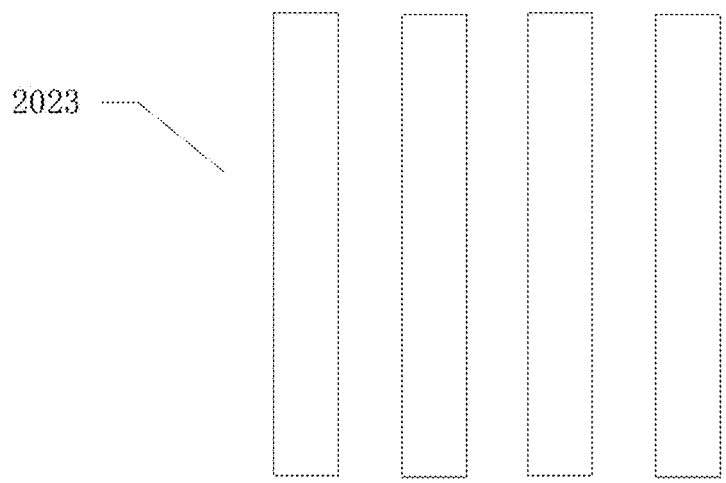

FIG. 3a and FIG. 3b show the first touch electrode layer 2021 and the second touch electrode layer 2023 of the touch sensor 202, respectively. For example, the first touch electrode layer 2021 may include a plurality of sensing electrodes spaced apart from each other, and the second touch electrode layer 2023 may include a plurality of driving electrodes spaced apart from each other; or, the first touch electrode layer 2021 may include a plurality of driving electrodes, and the second touch electrode layer 2023 may include a plurality of sensing electrodes. The plurality of sensing electrodes and the plurality of driving electrodes are all strip electrodes, an extending direction of the plurality of sensing electrodes is substantially perpendicular to an extending direction of the plurality of driving electrodes, and the plurality of sensing electrodes is arranged above the plurality of driving electrodes through the first substrate 2022, thereby forming a plurality of touch sensing capacitors distributed in an array form between the first touch electrode layer 2021 and the second touch electrode layer 2023 of the touch sensor 202, where the first substrate 2022 is located between the first touch electrode layer 2021 and the second touch electrode layer 2023, and serves as a dielectric layer of the plurality of touch sensing capacitors. When a finger touches or moves on the cover plate 201, a capacitance value of the touch sensing capacitor at a touch position of the finger is changed and a corresponding touch sensing signal is outputted. A mutual capacitance or self-capacitance driving signal may be applied to the first touch electrode layer 2021 or the second touch electrode layer 2023 to detect capacitance changes of the touch sensing capacitance caused by the touch or movement of the finger, thus obtaining coordinate information of the touch position of the finger or dynamic vector information generated by the movement of the finger (collectively referred to as finger position information below).

Figure 4:
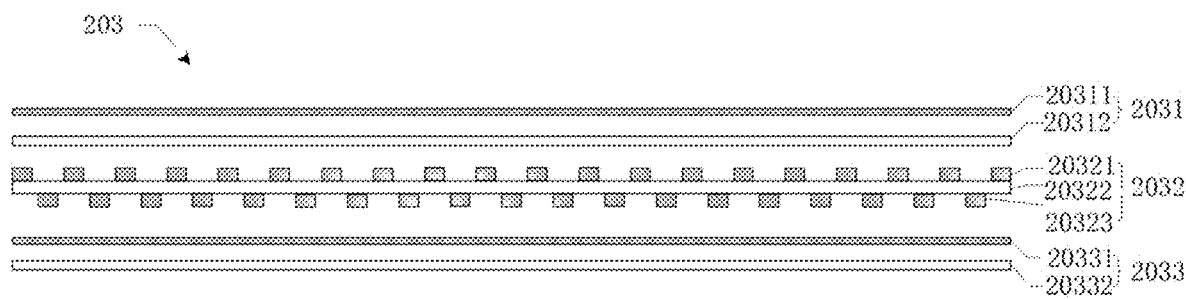
FIG. 4 is an exploded schematic diagram of a force sensor of the touch pad shown in FIG. 2.

The force sensor 203 is specifically a capacitive pressure sensor, is also known as a pressure-capacitance sensor, and is arranged between the touch sensor 202 and the PCB 204. As an embodiment, as shown in FIG. 2 and FIG. 4, the force sensor 203 includes a first pressure electrode layer 2031, a support structure 2032, and a second pressure electrode layer 2033 successively from top to bottom. The first pressure electrode layer 2031 and the second pressure electrode layer 2033 are spaced apart from each other by the support structure 2032 to form a pressure sensing capacitor for detecting a pressure applied by the finger when pressing the touch pad 200.

The first pressure electrode layer 2031 includes an upper electrode sublayer 20311 and an upper substrate sublayer 20312, the upper electrode sublayer 20311 is arranged on an upper surface of the upper substrate sublayer 20312; and the upper substrate sublayer 20312 is mainly used for carrying the upper electrode sublayer 20311, and further implementing electrical isolation and fixing by bonding of the first pressure electrode layer 2031 and other stacked layers of the touch pad 200. The second pressure electrode layer 2033 includes a lower electrode sublayer 20331 and a lower substrate sublayer 20332. The lower electrode sublayer 20331 is arranged on an upper surface of the lower substrate sublayer 20332. Similarly, the lower substrate sublayer 20332 is mainly used for carrying the lower electrode sublayer 20331, and further implementing electrical isolation and fixing by bonding of the second pressure electrode layer 2033 and other stacked layers of the touch pad 200.

Figure 5A:
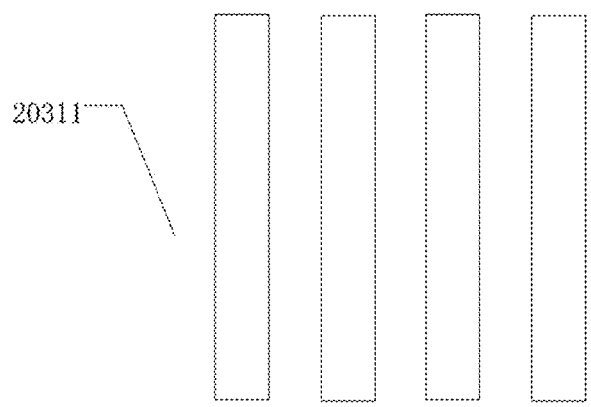
FIG. 5a and FIG. 5b are schematic diagrams of electrode patterns of the force sensor shown in FIG. 4.
Figure 5B:
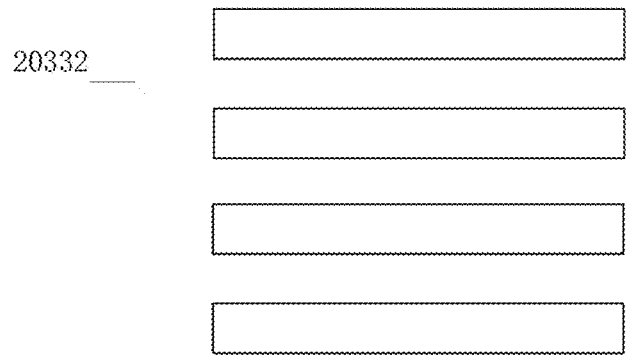

FIG. 5a and FIG. 5b show the upper electrode sublayer 20311 of the first pressure electrode layer 2031 and the lower electrode sublayer 20331 of the second pressure electrode layer 2033, respectively, where a structure of the upper electrode sublayer 20311 of the first pressure electrode layer 2031 shown in FIG. 5a is substantially the same as a structure of the second touch electrode layer 2023 of the touch sensor 202 shown in FIG. 3b, and a structure of the lower electrode sublayer 20331 of the second pressure electrode layer 2033 shown in FIG. 5b is substantially the same as a structure of the first touch electrode layer 2021 of the touch sensor 202 shown in FIG. 3a. Further, similar to the first touch electrode layer 2021 and the second touch electrode layer 2023 shown in FIG. 3a and FIG. 3b, the upper electrode sublayer 20311 may further include a plurality of pressure driving electrodes, and the lower electrode sublayer 20331 may further include a plurality of pressure sensing electrodes, where the plurality of pressure driving electrodes and the plurality of pressure sensing electrodes are all strip electrodes, and overlap each other through the support structure 2032, thereby forming a plurality of pressure sensing capacitors distributed in an array form between the first pressure electrode layer 2031 and the second pressure electrode layer 2033. In a specific implementation, a driving signal is provided to the first pressure electrode layer 2031, to output a corresponding pressure sensing signal from the pressure sensing capacitor at a finger pressing position, thereby detecting a magnitude of a pressure applied by the finger when pressing the touch pad 200 based on the pressure sensing signal collected by the second pressure electrode layer 2033.

Still further, in addition to the strip electrodes shown in FIG. 3a, FIG. 3b, FIG. 5a, and FIG. 5b, structures of other non-strip electrodes, such as a special-shaped electrode structure, may also be used by the first touch electrode layer 2021 and the second electrode layer 2023 of the touch sensor 202, and the upper electrode sublayer 20311 and the lower electrode sublayer 20331 of the force sensor 203. Further, in a specific implementation, the same electrode structure may be used by the second touch electrode layer 2023 of the touch sensor 202 and the upper electrode sublayer 20311 of the force sensor 203 (in some specific implementations, the two may even be further multiplexed as the same layer of electrode structure), and be used as a common driving electrode of the touch sensor 202 and the force sensor 203; while electrode structures of the first touch electrode layer 2021 of the touch sensor 202 and the lower electrode sublayer 20331 of the force sensor 203 may also be the same, may be substantially perpendicular to the second touch electrode layer 2023 and the upper electrode sublayer 20311 (for example, an electrode structure formed by rotating the second touch electrode layer 2023 of the touch sensor 203 by 90 degrees may be used by both of them), and may serve as sensing electrodes of the touch sensor 202 and the force sensor 203.

The support structure 2032 is a spacer layer located between the first pressure electrode layer 2031 and the second pressure electrode layer 2033, is fixed above the second pressure electrode layer 2033, supports the first pressure electrode layer 2031, and is configured to form a variable gap between the first pressure electrode layer 2031 and the second pressure electrode layer 2033. For example, the support structure 2032 may be elastically deformed under the action of an external force, i.e., the support structure 2032 is a deformable structure to change a gap width between the first pressure electrode layer 2031 and the second pressure electrode layer 2033 in a region on which the external force acts. More specifically, when the finger presses an upper surface of the cover plate 201, and applies a downward pressure, the pressure may be transmitted to the force sensor 203 through the cover plate 201 and the touch sensor 202, and may be further applied to the support structure 2032 through the first pressure electrode layer 2031. The support structure 2032 may provide a varying distance between the first pressure electrode layer 2031 and the second pressure electrode layer 2033, thereby changing the pressure sensing capacitance between the first pressure electrode layer 2021 and the second pressure electrode layer 2033 at the finger pressing position, and detecting a pressure applied to the cover plate 201 when the finger presses the cover plate 201 based on changes of the pressure sensing capacitance.

As shown in FIG. 4, the support structure 2032 includes first support bodies 20321, a flexible film layer 20322, and second support bodies 20323. The first support bodies 20321 are arranged on an upper surface of the flexible film layer 20322, and are connected to the upper substrate sublayer 20312 to support the first pressure electrode layer 2031; while the second support bodies 20323 are arranged on a lower surface of the flexible film layer 20322, and are connected to the lower electrode sublayer 20331 with an adhesive glue, to support the flexible film layer 20322 above the second pressure electrode layer 2033.

The first support bodies 20321 and the second support bodies 20323 may be hard particles uniformly distributed on the upper surface and the lower surface of the flexible film layer 20322, respectively, and the first support bodies 20321 and the second support bodies 20323 are arranged in a staggered manner, i.e., the first support bodies 20321 and the second support bodies 20323 are alternately distributed in a direction perpendicular to the surface of the flexible film layer 20322. In a specific embodiment, the first support bodies 20321 and the second support bodies 20323 are hard materials, for example, may be soldering tin, hard glue, or other hard materials. The support structure 2032 of the force sensor 203 may be integrated by injection molding to integrate the first support bodies 20321 and the second support bodies 20323 with the flexible film layer 20322, or the first support bodies 20321 and the second support bodies 20323 are stuck close to the upper surface and the lower surface of the flexible film layer 20322 respectively with an adhesive glue.

Based on the above structure, height of each of the first support bodies 20321 is used as a distance D1 between the first pressure electrode layer 2031 and the flexible film layer 20322, and height of each of the second support bodies 20323 is used as a distance D2 between the second pressure electrode layer 2033 and the flexible film layer 20322. When a finger presses the cover plate 201 and acts on the force sensor 203 through the touch sensor 202, the support structure 2032 is deformed under the action of a pressure applied by the finger. Specifically, the first support bodies 20321 is subjected to a downward force at the finger pressing position, driving the flexible film layer 20322 below the first support bodies 20321 to move downward, thereby reducing the distance D2 between the second pressure electrode layer 2033 of the force sensor 203 and the flexible film layer 20322; and further, the flexible film layer 20322 is supported by the second support bodies 20323, i.e., the second support bodies 20323 provide an upward supporting force to the flexible film layer 20322, and drives the flexible film layer 20322 above the second support bodies 20323 to move upward, thereby further reducing the distance D1 between the first electrode layer 2031 of the force sensor 203 and the flexible film layer 2032. Since both D1 and D2 are reduced, a gap width between the first pressure electrode layer 2031 and the second pressure electrode layer 2032 of the force sensor 203 is reduced, thereby increasing the pressure sensing capacitance at the finger pressing position. A magnitude of the pressure may be computed by detecting changes of the pressure sensing capacitance.

In order to improve the pressure detection precision, a flat layer (not shown in the figure) may be further provided below the support structure 2032, and the flat layer may provide a more precise variable gap width for the force sensor 203, thereby contributing to improving the pressure detection precision. The flat layer may be a film, which, for example, may be a PET substrate, a PC substrate, or a hybrid substrate of the two substrates.

The embodiments of the present disclosure further provide a preferred design solution for the support structure 2032 of the force sensor 203, so that both the first support bodies 20321 and the second support bodies 20323 can provide a variable gap width for the force sensor 203, and the variable gap width of the force sensor 203 is large enough, thereby contributing to improving the pressure detection precision.

Figure 6A:
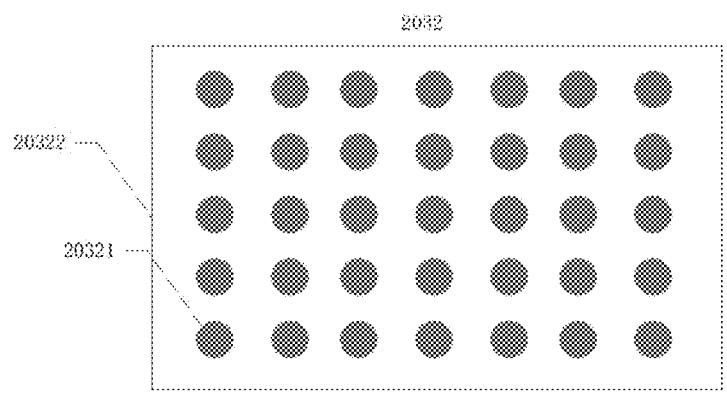
FIG. 6a to FIG. 6c are schematic diagrams of planar structures of the force sensor shown in FIG. 4.
Figure 6B:
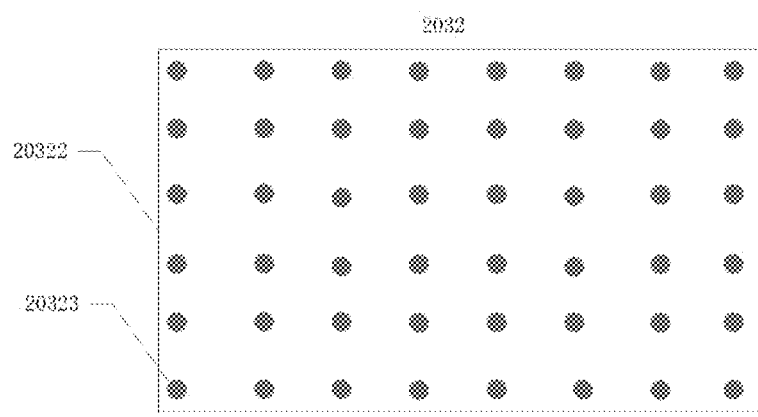
Figure 6C:
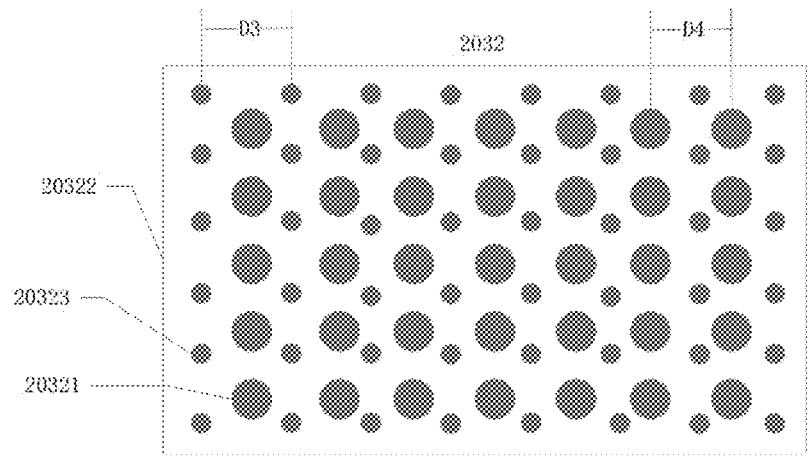

FIG. 6a and FIG. 6b show a front view of an upper surface and a front view of a lower surface of the flexible film layer 20322, respectively. The first support bodies 20321 are arranged in a matrix form on the upper surface of the flexible film layer 20322, the second support bodies 20323 are arranged in a matrix form on the lower surface of the flexible film layer 20322, and a size of one of the first support bodies 20321 is larger than a size of one of the second support bodies 20323. As a specific embodiment, both the first support bodies 20321 and the second support bodies 20323 are all round hard particles, a diameter of one of the first support bodies 20321 is greater than or equal to twice that of one of the second support bodies 20323, and preferably, the diameter of one of the first support bodies 20321 is at least three times that of one of the second support bodies 20323. FIG. 6c shows a schematic diagram of distribution of the first support bodies 20321 and the second support bodies 20323 on the flexible film layer 20322. The first support bodies 20321 and the second support bodies 20323 are arranged in a staggered manner on horizontal projection of the flexible film layer 20322. Specifically, as shown in FIG. 6c, a first support body 20321 is arranged at a center of a region defined by any four adjacent second support bodies 20323, respectively, and still further, a distance D4 between a center point of one of the first support bodies 20321 and a center point of an adjacent first support body 20321 is equal to a distance D3 between a center point of one of the second support bodies 20323 and a center point of an adjacent second support body 20323, thereby guaranteeing the uniform distribution and staggered arrangement between the first support bodies 20321 and the second support bodies 20323. The above array arrangement and the above specific size relationship are used for the first support bodies 20321 and the second support bodies 20323, such that when the flexible film layer 20322 is deformed under a pressure applied by a finger pressing on a surface of the cover plate 201, the first support bodies 20321 and the second support bodies 20323 may uniformly support the upper surface and the lower surface of the flexible film layer 20322, thereby not only guaranteeing that the flexible film layer 20322 can be deformed enough so that the pressure sensing capacitor has enough changes, but also guaranteeing uniform deformation of the flexible film layer 20322 and protecting the flexible film layer 20322. Therefore, the force sensor 203 can have sufficient sensitivity, and can uniformly sense a magnitude of the finger pressure on a surface of the touch pad 200.

In an alternative implementation, the size of one the first support bodies 20321 may also be set to be smaller than the size of one of the second support bodies 20323. For example, round hard particles are still used by the first support bodies 20321 and the second support bodies 20323, but the diameter of one of the first support bodies 20321 does not exceed half of the diameter of one of the second support bodies 20323. For example, the diameter of one of the first support bodies 20321 may be between one half and one third of the diameter of one of the second support bodies 20323. Such arrangements contribute to deformation control of the flexible film layer 20322 on the premise of guaranteeing the pressure detection sensitivity, thereby improving the pressing handfeel of the user's finger on the touch pad 200, and facilitating pressure detection.

Referring to FIG. 2 again, the PCB 204 is arranged below the force sensor 203, and not only carries and supports the touch sensor 202 and the force sensor 203, but also may carry electronic components and circuits of the touch pad 200, where the electronic components include, for example, a touch controller 209 and a plurality of actuators 206. The touch controller 209 is mounted on a lower surface of the PCB 204, is electrically connected to the touch sensor 202 and the force sensor 203 through connection lines of the PCB 204, and is not only configured to provide a driving signal for the touch sensor 202 and the force sensor 203 to drive the two to perform capacitive touch detection and pressure detection respectively, but also configured to receive a touch sensing signal outputted from the touch sensor 202 and a pressure sensing signal outputted from the force sensor 203 when the finger presses the touch pad 200, and determine the finger position information and a magnitude of a pressure applied by the finger based on the above touch sensing signal and the above pressure sensing signal. Further, the touch controller 209 may further be connected to the plurality of actuators 206, and is further configured to drive the actuators 206 to provide vibration feedback in response to the magnitude of the detected pressure. In a specific embodiment, the touch controller 209 may be a touch control chip that integrates pressure detection and touch position detection, or may include two separately arranged pressure detection chips for detecting a pressure and touch control chips for detecting a touch position. The actuators 206 may be pasted under the PCB 204 through foam, which may provide a buffer function for the vibration of the actuators 206, where the actuators 206 may be linear motors or piezoelectric ceramic.

The bracket 205 may be a reinforcing plate made of stainless steel, and is configured to increase the hardness of the touch pad 200 to prevent the touch pad 200 from being collapsed when being pressed. Further, the bracket 205 provides support for the touch pad 200. The bracket 205 covers the lower surface of the PCB 204, and includes a plurality of openings, where the openings are used to provide an avoidance space for electronic components such as the touch controller 209 and the actuators 206 arranged on the lower surface of the PCB 204.

Figure 7A:
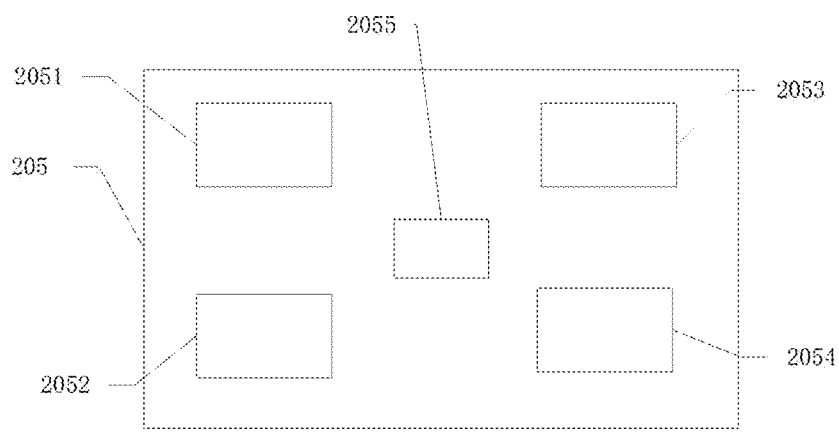
FIG. 7a is a schematic structural diagram of an implementation of a bracket of the touch pad shown in FIG. 2.

In an alternative embodiment, the actuators 206 are the piezoelectric ceramic. More specifically, the touch pad 200 includes four piezoelectric ceramic actuators, which are arranged in four corner regions of the lower surface of the PCB 204 respectively, and can vibrate in a direction perpendicular to the PCB 204. Correspondingly, as shown in FIG. 7a, the bracket 205 is formed with openings in four corner regions thereof, respectively, for use as a first piezoelectric ceramic accommodating portion 2051, a second piezoelectric ceramic accommodating portion 2052, a third piezoelectric ceramic accommodating portion 2053, and a fourth piezoelectric ceramic accommodating portion 2054. The piezoelectric ceramic accommodating portions 2051-2054 are located in an upper left corner region, a lower left corner region, an upper right corner region, and a lower right corner region of the bracket 205 respectively, for accommodating the four piezoelectric ceramic actuators. Further, another opening is further formed in a middle region of the bracket 205 for use as a touch controller accommodating portion 2055, where the touch controller accommodating portion 2055 is configured to accommodate the touch controller 209 and other electronic components located in a middle region of the lower surface of the PCB 204. The piezoelectric ceramic is arranged at four corner positions of the touch pad 200, to improve the consistency of vibration of the touch pad.

Figure 7B:
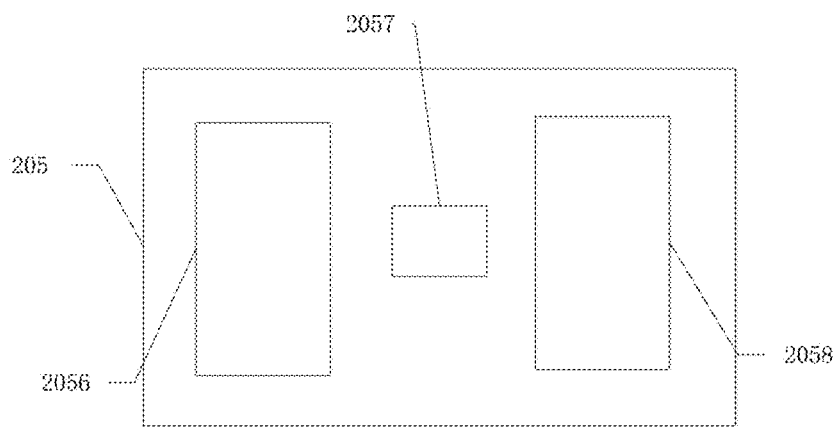
FIG. 7b is a schematic structural diagram of another implementation of the bracket of the touch pad shown in FIG. 2.

As another alternative embodiment, the actuators 206 may be linear motors. More specifically, the linear motors may be arranged in the middle region of the lower surface of the PCB 204, and may horizontally vibrate in a direction parallel to the PCB 204. Correspondingly, as shown in FIG. 7b, an opening may be formed in the middle region of the bracket 205 for use as a linear motor accommodating portion 2057 for accommodating the linear motor. In addition, the bracket 205 may further be formed with a first opening 2056 and a second opening 2058 on both sides of the linear motor accommodating portion 2057, where the first opening and the second opening are arranged close to edges on both sides of the bracket 205 respectively for accommodating the touch controller 209 and other electronic components of the PCB 204. The linear motor is arranged at a center position of the touch pad 200, to improve the vibration effects of the touch pad 200.

For different types of actuators, different openings are provided on the bracket 205 to reduce the thickness of the touch pad without affecting the vibration effects.

In FIG. 2, the touch pad 200 further includes a fixing member 207, where the fixing member 207 is configured to fix the touch pad 200 on a casing of the electronic device. Specifically, the bracket 205 is provided with a small hole at the position of the fixing member 207, where the small hole is used to accommodate the fixing member 207. The bracket 205 fixes the touch pad 200 to a casing of an electronic device through the fixing member 207. For example, the casing of the electronic device may be a C shell of a notebook computer, and the fixing member 207 may be a screw.

The touch pad 200 provided in the embodiments of the present disclosure is provided with the force sensor 203 below the touch sensor 202, and the force sensor 203 forms pressure sensing capacitors in the pressure electrode layers 2031 and 2033 on both sides using the support structure 2032, thereby detecting the magnitude of the pressure applied by the finger when pressing the touch pad 200 in a pressure-capacitance manner, and further providing tactile feedback. Compared with a conventional touch pad using a piezoresistive force sensor, the touch pad 200 provided in the present embodiment is cheap with a simple structure, further has the effects of small thickness and high pressure detection sensitivity, and may be adapted to electronic devices in different application scenarios.

Figure 8:
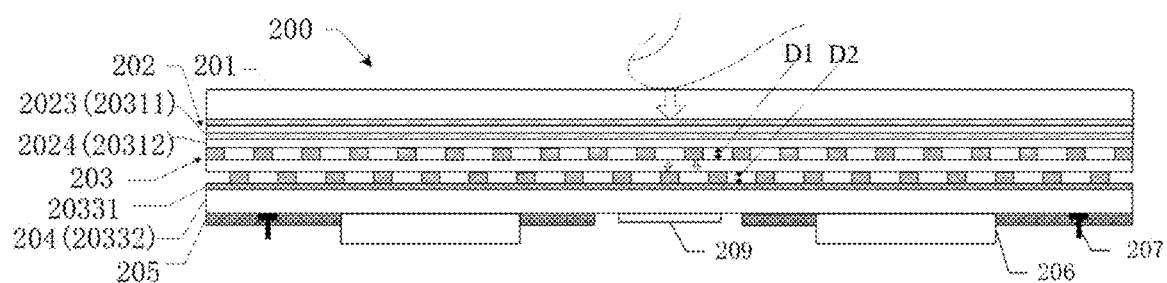
FIG. 8 is a schematic diagram of a laminated structure of a touch pad in a second embodiment of the present disclosure.

Based on the touch pad structure shown in FIG. 2, as an improved solution, as shown in FIG. 8, the second touch electrode layer 2023 and the second substrate 2024 of the touch sensor 202 may be multiplexed by the first pressure electrode layer 2031 of the force sensor 203, which is equivalent to that the upper electrode sublayer 20311 and the upper substrate sublayer 20312 of the first pressure electrode layer 2031 shown in FIG. 2 may be omitted, thereby effectively reducing the thickness of the touch pad 200. More specifically, both the second touch electrode layer 2023 and the second substrate 2024 of the touch sensor 202 may be used as the upper electrode sublayer 20311 and the upper substrate sublayer 20312 of the first pressure electrode layer 2031, respectively, i.e., the second touch electrode layer 2023 of the touch sensor 202 may be used as a common electrode layer of the touch sensor 202 and the force sensor 203, which not only may form a touch sensing capacitor with the first touch electrode layer 2021 above it, but also may further form a pressure sensing capacitor with the second pressure electrode layer 2033 below the support structure 2032.

Alternatively, in order to further reduce the thickness of the touch pad 200, the PCB 204 may also be directly multiplexed by the lower substrate sublayer 20332 of the second pressure electrode layer 2033 of the force sensor 203, i.e., the lower electrode sublayer 20331 of the second pressure electrode layer 2033 may be directly formed on a surface of the PCB 204. In this case, this is equivalent to that the lower substrate sublayer 20332 of the second pressure electrode layer 2033 shown in FIG. 2 may be omitted, and the PCB 204 may be simultaneously used as the substrate of the lower electrode sublayer 20331 of the second pressure electrode layer 2033.

Further, in the embodiment shown in FIG. 8, preferably, the second touch electrode layer 2023 is used as a common driving electrode layer of the touch sensor 202 and the force sensor 203, and includes a plurality of common driving electrodes, specifically as shown in FIG. 3b or 5a; while the first touch electrode layer 2021 is used as the touch sensing electrode layer of the touch sensor 202, and includes a plurality of touch sensing electrodes, specifically as shown in FIG. 3a, and the second pressure electrode layer 2033 of the force sensor 203 is used as the pressure sensing electrode layer of the force sensor 203, and includes a plurality of pressure sensing electrodes, specifically as shown in FIG. 5b. Based on the above multiplexing structure, in the working process, a driving signal is sent to the second touch electrode layer 2023 once, the first touch electrode layer 2021 of the touch sensor 202 and the second pressure electrode layer 2033 of the force sensor 203 may be used as a detected touch sensing signal and a detected pressure sensing signal caused by the finger touch/pressing, which are used for computing the touch position and the magnitude of the pressure of the finger, improving the response speed of the touch pad 200, and effectively reducing the power consumption of the touch pad 200.

In another implementation, driving signals of the touch sensor 202 and the force sensor 203 may also be provided to the second touch electrode layer 2023 in a time sharing manner. For example, at a first moment, the touch controller 209 may first provide the touch driving signal to the second touch electrode layer 2023, receive the touch sensing signal outputted from the first touch electrode layer 2021 of the touch sensor 202, and further compute touch position information of the finger; and at a second moment, the touch controller 209 may provide a pressure driving signal to the second touch electrode layer 2023, receive the pressure sensing signal outputted from the second pressure electrode layer 2033 of the force sensor 203, and further compute the magnitude of the pressure applied by the finger when pressing the touch controller.

Compared with the embodiment shown in FIG. 2, in the touch pad 200 shown in FIG. 8, a part of structure of the touch sensor 202 and the PCB 204 are multiplexed by the first pressure electrode layer 2031 and the lower substrate sublayer 20332 of the force sensor 203 respectively through the above laminated multiplexing structure, thereby reducing the thickness of the touch pad 200 without affecting the pressure detection precision, and reducing the costs of the touch pad 200; further achieving touch detection and pressure detection by once-through driving, improving the response speed of the touch pad 200, and reducing the power consumption.

Figure 9:
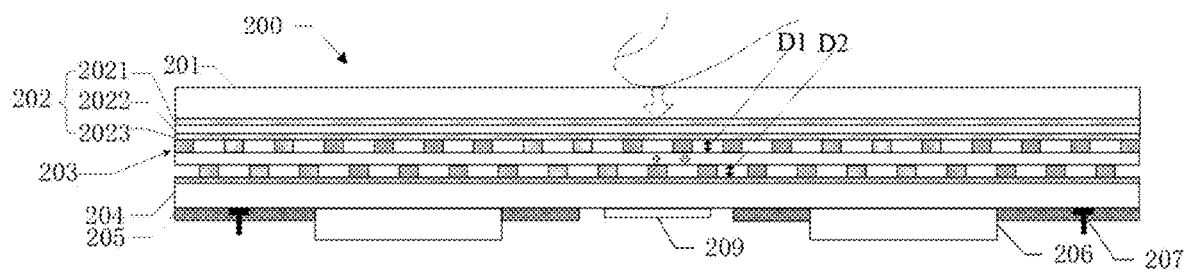
FIG. 9 is a schematic diagram of a laminated structure of a touch pad in a third embodiment of the present disclosure.

Referring to FIG. 9, in another alternative implementation, the touch pad 200 shown in FIG. 9 is substantially similar to that in the embodiment shown in FIG. 8, and the main difference is that the touch sensor 202 of the touch pad 200 shown in FIG. 9 carries the first touch electrode layer 2021 and the second touch electrode layer 2023 using the same layer of substrate 2022. Specifically, the touch sensor 202 includes a first touch electrode layer 2021, a first substrate 2022, and a second touch electrode layer 2023 successively from top to bottom, where the first touch electrode layer 2021 is arranged on the upper surface of the first substrate 2022, and the second touch electrode layer 2023 is arranged on the lower surface of the first substrate 2022. The first substrate 2022 provides support for the first touch electrode layer 2021 and the second touch electrode layer 2023. The first touch electrode layer 2021 may be a sensing electrode, and the second touch electrode layer 2023 may be a driving electrode.

Compared with the embodiment shown in FIG. 8, one layer of the substrate of the touch sensor 202 is further omitted in the touch pad 200 shown in FIG. 9, thereby further reducing the overall thickness of the touch pad 200, and being adapted to other application scenarios where the thickness of the touch pad is more strictly restricted.

Figure 10:
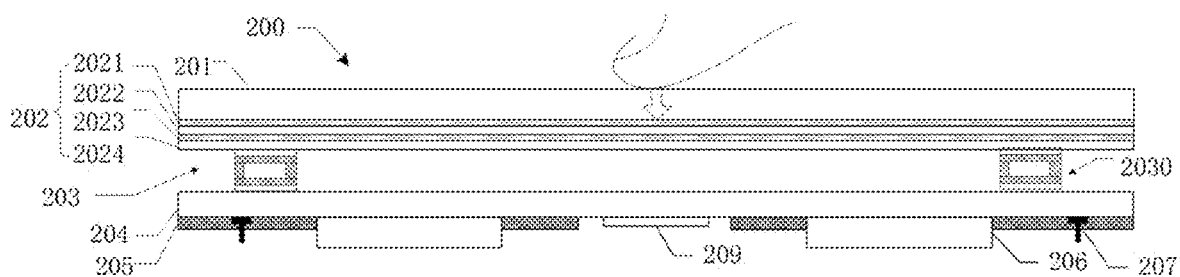
FIG. 10 is a schematic diagram of a laminated structure of a touch pad in a fourth embodiment of the present disclosure.
Figure 11:
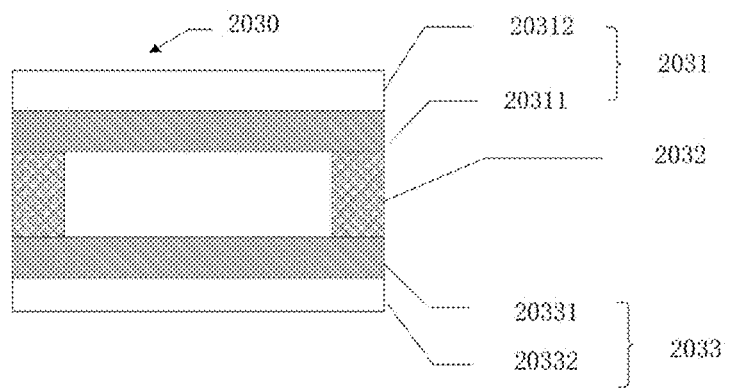
FIG. 11 is a schematic structural diagram of a force sensor unit of the touch pad shown in FIG. 10.

Based on the touch pad structure shown in FIG. 2, as an improved solution, as shown in FIG. 10 and FIG. 11, the force sensor 203 includes a plurality of force sensor units 2030, and the force sensor units 2030 are arranged between the touch sensor 202 and the PCB 204. As an embodiment, the force sensor unit 2030 includes a first pressure electrode layer 2031, a support structure 2032, and a second pressure electrode layer 2033 successively from top to bottom. The first pressure electrode layer 2031 and the second pressure electrode layer 2032 are spaced apart from each other by the support structure 2032 to form a pressure sensing capacitor for detecting a pressure applied by a finger when pressing the touch pad 200.

The first pressure electrode layer 2031 includes an upper electrode sublayer 20311 and an upper substrate sublayer 20312, the upper electrode sublayer 20311 is arranged on a lower surface of the upper substrate sublayer 20312; and the upper substrate sublayer 20312 is mainly used for carrying the upper electrode sublayer 20311, and further implementing electrical isolation and fixing by bonding of the first pressure electrode layer 2031 and other stacked layers of the touch pad 200. The second pressure electrode layer 2033 includes a lower electrode sublayer 20331 and a lower substrate sublayer 20332. The lower electrode sublayer 20331 is arranged on an upper surface of the lower substrate sublayer 20332. Similarly, the lower substrate sublayer 20332 is mainly used for carrying the lower electrode sublayer 20331, and further implementing electrical isolation and fixing by bonding of the second pressure electrode layer 2032 and other stacked layers of the touch pad 200.

The support structure 2032 is a spacer layer located between the first pressure electrode layer 2031 and the second pressure electrode layer 2033, is fixed above the second pressure electrode layer 2033, supports the first pressure electrode layer 2031, and is configured to form a variable gap between the first pressure electrode layer 2031 and the second pressure electrode layer 2033. For example, the support structure 2032 may be elastically deformed under the action of an external force, i.e., the support structure 2032 is a deformable structure to change a gap width between the first pressure electrode layer 2031 and the second pressure electrode layer 2033 in a region on which the external force acts. More specifically, when the finger presses an upper surface of the cover plate 201, and applies a downward pressure, the pressure may be transmitted to the force sensor 203 through the cover plate 201 and the touch sensor 202, and may be further applied to the support structure 2032 through the first pressure electrode layer 2031. The support structure 2032 may provide a varying distance between the first pressure electrode layer 2031 and the second pressure electrode layer 2033, thereby changing the pressure sensing capacitance between the first pressure electrode layer 2021 and the second pressure electrode layer 2033 at the finger pressing position, and detecting a pressure applied to the cover plate 201 when the finger presses the cover plate 201 based on changes of the pressure sensing capacitance.

The support structure 2032 is a deformable structure, and specifically may be an elastic medium, such as silica gel, foam, or other compressible elastic materials.

The touch pad 200 provided in the embodiments of the present disclosure is provided with the force sensor 203 below the touch sensor 202; the force sensor 203 is set as a plurality of force sensor units 2030 distributed at different positions of the touch pad based on pressure detection requirements, the support structure 2032 is set as an elastic medium, and pressure sensing capacitors are formed in the pressure electrode layers 2031 and 2033 on both sides using the support structure 2032, thereby reducing the costs of the touch pad 200 without affecting force detection.

Figure 12:
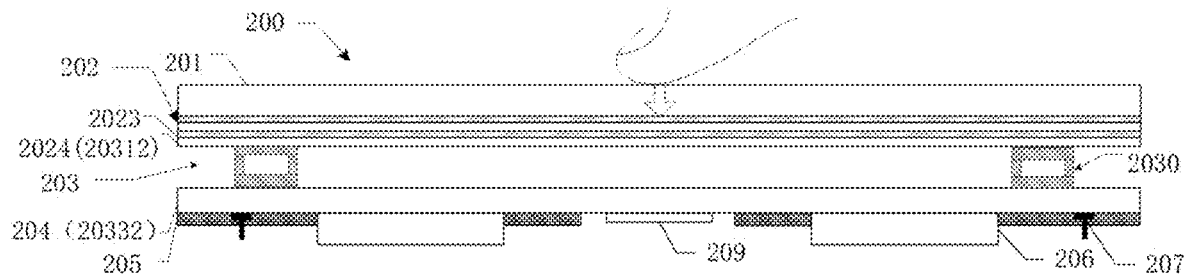
FIG. 12 is a schematic diagram of a laminated structure of a touch pad in a fifth embodiment of the present disclosure.

Referring to FIG. 12, in another alternative implementation, the second substrate 2024 of the touch sensor 202 may be multiplexed by the upper substrate sublayer 20312 of the first pressure electrode layer 2031 of the force sensor 203, which is equivalent to that the upper substrate sublayer 20312 of the first pressure electrode layer 2031 shown in FIG. 11 may be omitted, thereby effectively reducing the thickness of the touch pad 200.

Alternatively, in order to further reduce the thickness of the touch pad 200, the PCB 204 may also be directly multiplexed by the lower substrate sublayer 20332 of the second pressure electrode layer 2033 of the force sensor 203, i.e., the lower electrode sublayer 20331 of the second pressure electrode layer 2033 may be directly formed on a surface of the PCB 204. In this case, this is equivalent to that the lower substrate sublayer 20332 of the second pressure electrode layer 2033 shown in FIG. 10 and FIG. 11 may be omitted, and the PCB 204 may simultaneously be used as the substrate of the lower electrode sublayer 20331 of the second pressure electrode layer 2033.

Figure 13:
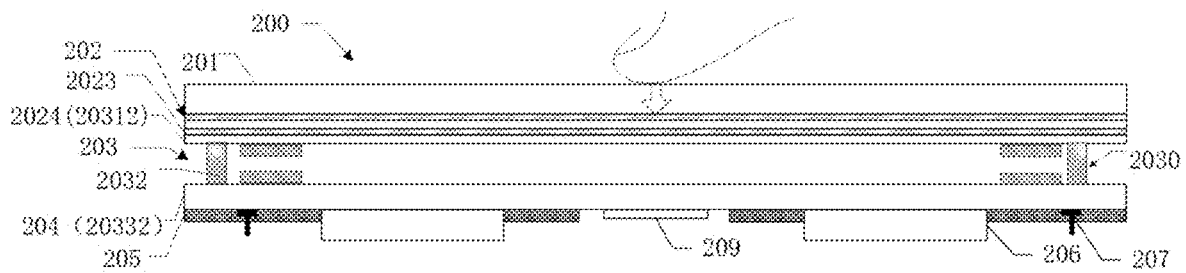
FIG. 13 is a schematic diagram of a laminated structure of a touch pad in a sixth embodiment of the present disclosure.

Referring to FIG. 13, in another alternative implementation, the touch pad 200 shown in FIG. 13 is substantially similar to that in the embodiment shown in FIG. 12, and the main difference is that the support structure 2032 of the force sensor unit 203 in the touch pad 200 shown in FIG. 13 is arranged between the touch sensor 202 and the PCB 204. The support structure 2032 is a deformable structure, and specifically may be an elastic medium. When a finger presses the cover plate 201, and acts on the force sensor 203 through the touch sensor 202, the support structure 2032 is deformed under the action of a pressure applied by the finger, thereby reducing the gap width between the two electrode layers of the force sensor 203, increasing the pressure sensing capacitance at the finger pressing position, and computing a magnitude of the pressure by detecting changes of the pressure sensing capacitance. The support structure 2032 is arranged between the touch sensor 202 and the PCB 204, thereby guaranteeing the pressure detection precision of the force sensor 203.

Figure 14:
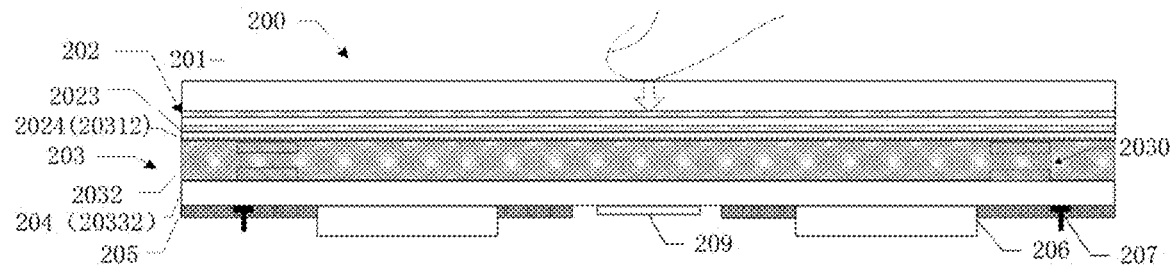
FIG. 14 is a schematic diagram of a laminated structure of a touch pad in a seventh embodiment of the present disclosure.

Referring to FIG. 14, in another alternative implementation, the touch pad 200 shown in FIG. 14 is substantially similar to that in the embodiment shown in FIG. 13, and the main difference is that the support structure 2032 of the force sensor unit 203 in the touch pad 200 shown in FIG. 14 is spread between the touch sensor 202 and the PCB 204, and when a finger presses the touch pad 200 at any position, the support structure 2032 under the finger is more obviously deformed, thereby contributing to improving the pressure detection precision.

Figure 15:
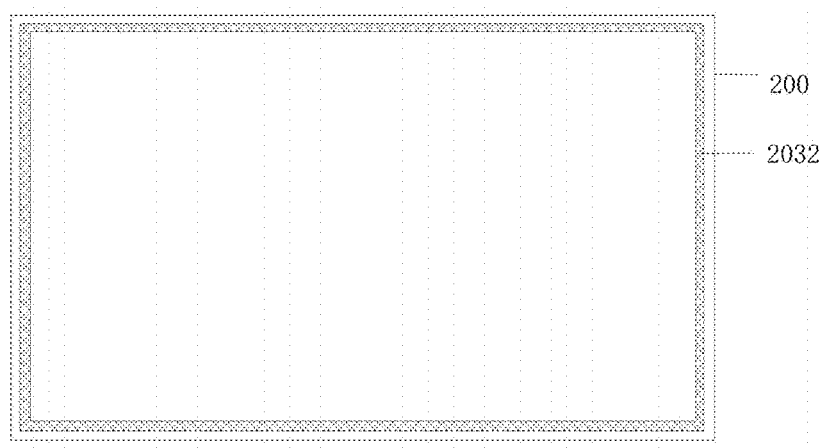
FIG. 15 is a schematic positional diagram of a support structure of the touch pad shown in FIG. 14.

Referring to FIG. 15, in another alternative implementation, the touch pad 200 shown in FIG. 15 is substantially similar to that in the embodiment shown in FIG. 13, and the main difference is that the support structure 2032 may not be spread between the touch sensor 202 and the PCB 204, but is only laid around the touch pad 200, thereby reducing the costs of the touch pad 200 without affecting the pressure detection precision.

Figure 16:
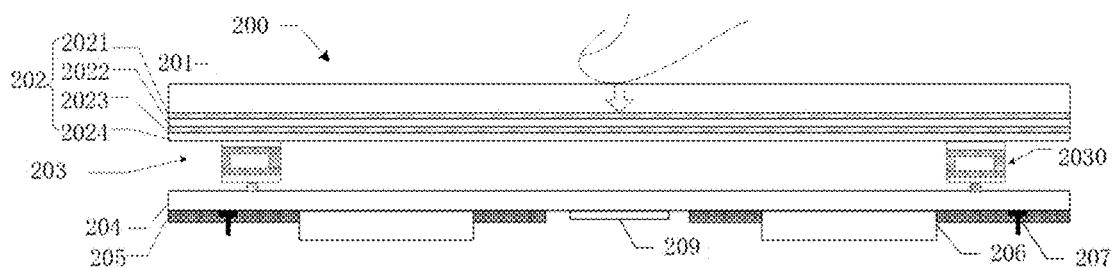
FIG. 16 is a schematic diagram of a laminated structure of a touch pad in an eighth embodiment of the present disclosure.
Figure 17:
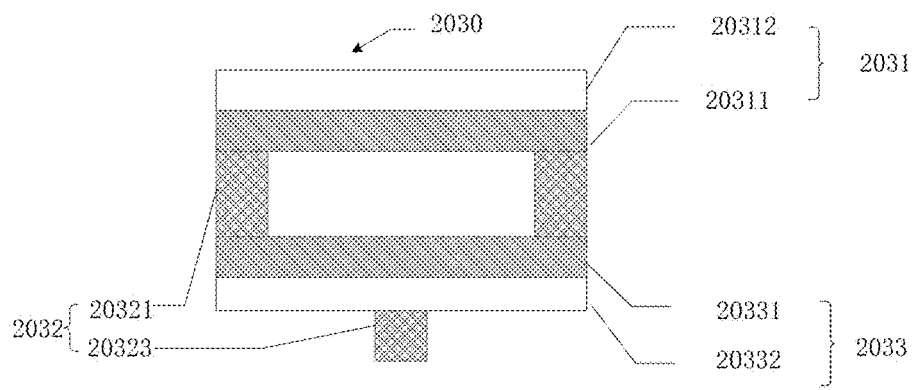
FIG. 17 is a schematic structural diagram of a force sensor unit of the touch pad shown in FIG. 16.

Based on the touch pad structure shown in FIG. 2, as an improved solution, as shown in FIG. 16 and FIG. 17, the force sensor 203 includes a plurality of force sensor units 2030, and the force sensor units 2030 are arranged between the touch sensor 202 and the PCB 204. As an embodiment, the force sensor unit 2030 includes a first pressure electrode layer 2031, a support structure 2032, and a second pressure electrode layer 2033. The first pressure electrode layer 2031 and the second pressure electrode layer 2032 are spaced apart from each other by the support structure 2032 to form a pressure sensing capacitor for detecting a pressure applied by a finger when pressing the touch pad 200.

The first pressure electrode layer 2031 includes an upper electrode sublayer 20311 and an upper substrate sublayer 20312, the upper electrode sublayer 20311 is arranged on a lower surface of the upper substrate sublayer 20312; and the upper substrate sublayer 20312 is mainly used for carrying the upper electrode sublayer 20311, and further implementing electrical isolation and fixing by bonding of the first pressure electrode layer 2031 and other stacked layers of the touch pad 200. The second pressure electrode layer 2033 includes a lower electrode sublayer 20331 and a lower substrate sublayer 20332. The lower electrode sublayer 20331 is arranged on an upper surface of the lower substrate sublayer 20332. Similarly, the lower substrate sublayer 20332 is mainly used for carrying the lower electrode sublayer 20331, and further implementing electrical isolation and fixing by bonding of the second pressure electrode layer 2032 and other stacked layers of the touch pad 200.

The support structure 2032 includes first support bodies 20321 and second support bodies 20323, where the first support bodies 20321 are located between the first pressure electrode layer 2031 and the second pressure electrode layer 2033, are fixed above the second pressure electrode layer 2033, support the first pressure electrode layer 2031, and are configured to form a variable gap between the first pressure electrode layer 2031 and the second pressure electrode layer 2033; and the second support bodies 20323 are located between the second pressure electrode layer 2033 and the PCB 204, are fixed above the PCB 204, and support the second pressure electrode layer 2033. The support structure 2032 may be elastically deformed under the action of an external force, i.e., the support structure 2032 is a deformable structure to change a gap width between the first pressure electrode layer 2031 and the second pressure electrode layer 2033 in a region on which the external force acts. More specifically, when the finger presses the upper surface of the cover plate 201 and applies a downward pressure, the pressure may be transmitted to the force sensor 203 through the cover plate 201 and the touch sensor 202, and further applied to the first support bodies 20321 through the first pressure electrode layer 2031. The first pressure electrode layer 2031 and the first support bodies 20321 are subjected to a downward force; and the second support bodies 20323 provide an upward support force for the second pressure electrode layer 2033, and drives the second pressure electrode layer 2033 above the second support bodies 20323 to displace upward, thereby further reducing a gap width between the first pressure electrode layer 2031 and the second pressure electrode layer 2033, increasing the pressure sensing capacitance at the finger pressing position, and computing a magnitude of the pressure by detecting changes of the pressure sensing capacitance.

In a specific embodiment, the first support bodies 20321 and the second support bodies 20323 are hard materials, for example, may be soldering tin, hard glue, or other hard materials.

Compared with the embodiment shown in FIG. 2, in the touch pad 200 shown in FIG. 16, the force sensor 203 is set as a plurality of force sensor units 2030 distributed at different positions of the touch pad, thereby guaranteeing the pressure detection precision of the force sensor 203.

Figure 18:
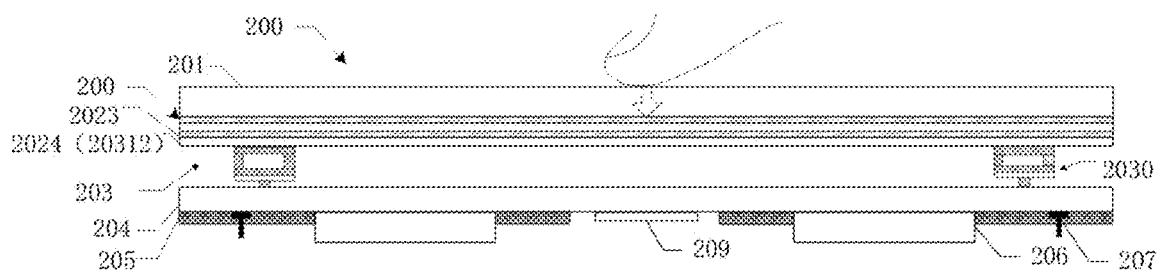
FIG. 18 is a schematic diagram of a laminated structure of a touch pad in a ninth embodiment of the present disclosure.

Referring to FIG. 18, in another alternative implementation, the second substrate 2024 of the touch sensor 202 may be multiplexed by the upper substrate sublayer 20312 of the first pressure electrode layer 2031 of the force sensor 203, which is equivalent to that the upper substrate sublayer 20312 of the first pressure electrode layer 2031 shown in FIG. 17 may be omitted, thereby effectively reducing the thickness of the touch pad 200.

Figure 19:
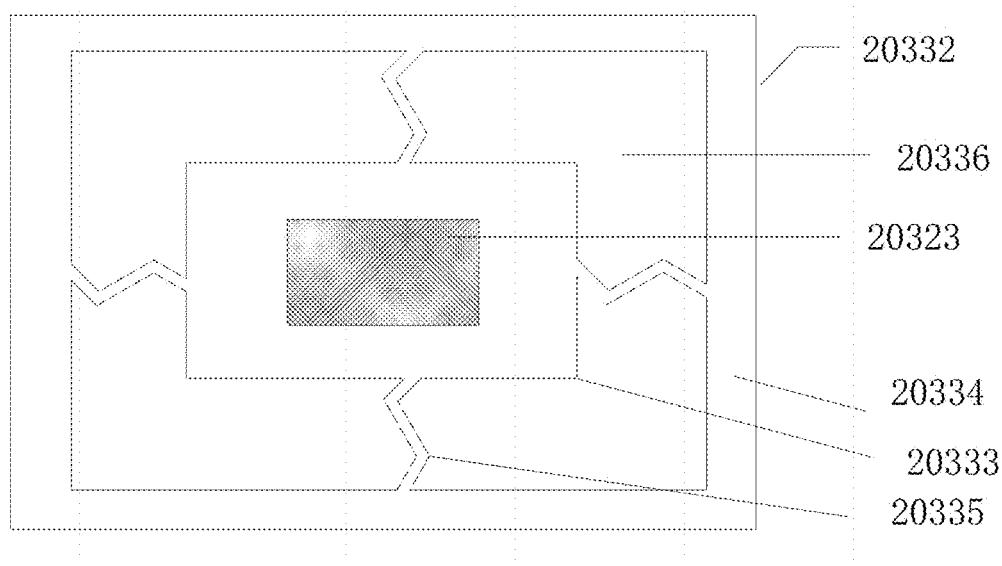
FIG. 19 is a schematic structural diagram of an implementation of a lower substrate sublayer and a second support member of the touch pad shown in FIG. 18.

In an embodiment, the lower substrate sublayer 20332 and the second support member 20323 may be as shown in FIG. 19; the lower substrate sublayer 20332 may be in a hollowed shape, and specifically includes a non-hollowed rectangular substrate 20333 and a hollowed rectangular substrate 20334, the non-hollowed rectangular substrate 20333 is connected to the hollowed rectangular substrate 20334 through a curved substrate 20335, thus forming 4 hollowed regions 20336. When a finger presses the touch pad, the non-hollowed rectangular substrate 20333 is subjected to an upward force, and can generate a larger variable gap width through the curved substrate 20335, such that a distance between the first pressure electrode layer 2031 and the second pressure electrode layer 2033 is smaller, thereby improving the pressure detection sensitivity.

Figure 20:
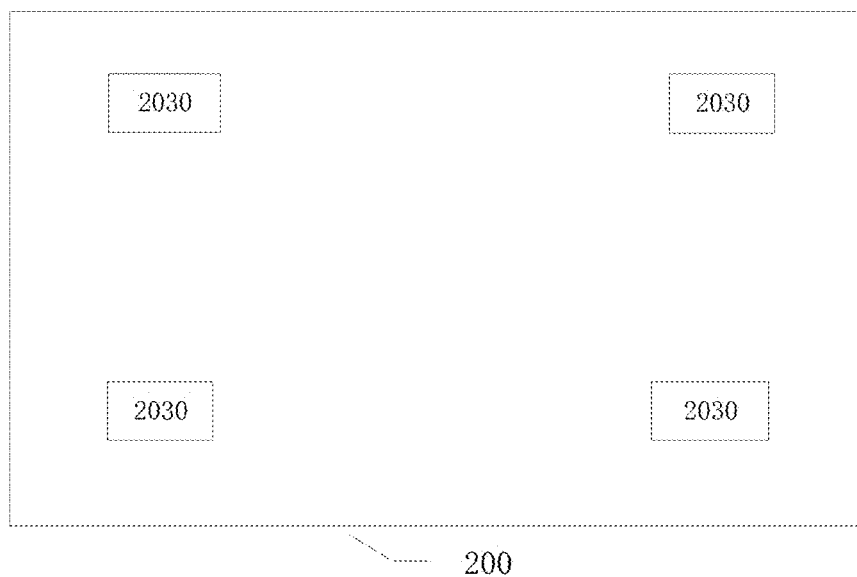
FIG. 20 is a schematic positional diagram of a force sensor unit in a fourth embodiment to a ninth embodiment of the present disclosure.

Alternatively, as shown in FIG. 20, the force sensor units 2030 may be arranged at four corner positions of the touch pad 200, and such arrangement reduces the costs of the touch pad 200 without affecting the pressure detection precision.

An embodiment of the present disclosure further provides a touch pad, including a touch sensing electrode layer including a plurality of touch sensing electrodes spaced apart from each other; a common electrode layer arranged below the touch sensing electrode layer, and including a plurality of common driving electrodes spaced apart from each other, where a plurality of touch sensing capacitors is formed between the common driving electrodes and the touch sensing electrodes, and the plurality of touch sensing capacitors is used as touch sensors and is configured to, when a finger touches or presses the touch pad, sense a touch position of the finger and output a corresponding touch sensing signal; a pressure sensing electrode layer arranged below the common electrode layer, and including a plurality of pressure sensing electrodes spaced apart from each other, where a plurality of pressure sensing capacitors is formed between the pressure sensing electrodes and the common driving electrodes, and the plurality of pressure sensing capacitors is used as force sensors, and is configured to detect a magnitude of a pressure applied by the finger when pressing the touch pad; and a printed circuit board configured to carry the pressure sensing electrode layer, where the plurality of pressure sensing electrodes is formed on a surface of the printed circuit board; where a support structure is arranged between the common electrode layer and the pressure sensing electrode layer, and the support structure is a deformable structure for deformation under the action of the pressure applied by the finger to change a pressure sensing capacitance of a finger pressing region.

The touch pad provided in the present embodiment is provided with a common electrode layer, a plurality of touch sensing capacitors is formed between common electrode layer and the touch sensing electrodes respectively for detecting a touch position of a finger, a plurality of pressure sensing capacitors is formed between the common electrode layer and the pressure sensing electrodes, and pressure sensing capacitors are formed in the pressure electrode layers on both sides using the support structure, thereby detecting the magnitude of the pressure applied by the finger when pressing the touch pad in a pressure-capacitance manner. Compared with a conventional touch pad using a piezoresistive force sensor, the touch pad provided in the present embodiment is cheap with a simple structure, further has the effects of small thickness and high pressure detection sensitivity, and may be adapted to electronic devices in different application scenarios. An embodiment of the present disclosure further provides a pressure touch apparatus, including a cover plate configured to provide an input interface for a touch or press of a finger; a touch sensor arranged below the cover plate, and configured to sense a touch position of the finger when the finger touches or presses the cover plate, and output a corresponding touch sensing signal; a force sensor arranged below the touch sensor, and includes a support structure and at least one pressure electrode layer; where the at least one pressure electrode layer is configured to form a plurality of pressure sensing capacitors below the touch sensor; and the support structure is a deformable structure, and is configured to deform under the action of a pressure applied by the finger when pressing the pressure touch apparatus to change a pressure sensing capacitance of a finger pressing region; a printed circuit board arranged below the force sensor, and configured to carry and support the force sensor and the touch sensor; and a touch controller mounted and fixed to the printed circuit board, electrically connected to the touch sensor and the force sensor, and configured to receive the touch sensing signal from the touch sensor and a pressure sensing signal from the force sensor, and determine the touch position of the finger on the pressure touch apparatus and a magnitude of the pressure applied by the finger.

The pressure touch apparatus provided in the present embodiment is provided with the force sensor below the touch sensor, and the force sensor forms a pressure sensing capacitor between pressure electrode layers on both sides using the support structure, thereby detecting the magnitude of the pressure applied by the finger when pressing the surface of the cover plate in a pressure-capacitance manner. Compared with a conventional pressure touch apparatus using a piezoresistive force sensor, the pressure touch apparatus provided in the present embodiment is cheap with a simple structure, further has the effects of small thickness and high pressure detection sensitivity, and may be adapted to electronic devices in different application scenarios.

An embodiment of the present disclosure further provides an electronic device, including a displayer and the touch pad in various embodiments described above, where the touch pad is configured to, when a finger touches or presses the touch pad, detect a touch position of the finger and a magnitude of a pressure applied by the finger, and the displayer is configured to display an operation related to the touch or press of the finger.

It should be noted that the embodiments in the present disclosure and/or the technical features in the embodiments may be randomly combined with each other on a non-conflict basis, and the combined technical solutions should also fall into the scope of protection of the present disclosure.

The structure or device disclosed in the embodiments of the present disclosure may be implemented by other approaches. The above described apparatus embodiments are merely illustrative, the division of the units is only a logical function division, other division manners may be available during actual implementations, and a plurality of units or components may be combined or may be integrated into another system. In addition, the coupling between the units or the coupling between the components may be direct coupling or indirect coupling, and the above coupling includes electrical, mechanical, or other forms of connection.

It should be understood that the specific examples in the embodiments of the present disclosure are provided only to help those skilled in the art to better understand the embodiments of the present disclosure, rather than limiting the scope of the embodiments of the present disclosure. Those skilled in the art may make various improvements and modifications on the basis of the above embodiments, and these improvements or modifications all fall within the scope of protection of the present disclosure.

While the above description merely provides specific embodiments of the present disclosure, the scope of protection of the present disclosure is not limited to the specific embodiments. Any person skilled in the art may easily conceive of variations or replacements without departing from the technical scope disclosed in the present disclosure. All variations or replacements should be encompassed within the scope of protection of the present disclosure. Therefore, the scope of protection of the present disclosure should be determined by the scope of protection of the appended claims.

The invention claimed is:

1. A touch pad, comprising a touch sensor, a force sensor, a printed circuit board, and a touch controller; wherein the touch sensor comprises a first touch electrode layer, a second touch electrode layer, and a first substrate; the first touch electrode layer is arranged above the second touch electrode layer through the first substrate, and forms a plurality of touch sensing capacitors with the second touch electrode layer; and the plurality of touch sensing capacitors are configured to, when a finger touches or presses the touch pad, sense a touch position of the finger and output a corresponding touch sensing signal;

the force sensor is arranged below the touch sensor, and comprises a support structure and at least one pressure electrode layer; the at least one pressure electrode layer is configured to form a plurality of pressure sensing capacitors below the touch sensor; and the support structure is a deformable structure, and is configured to deform under an action of a pressure applied by the finger when pressing the touch pad to change a pressure sensing capacitance of a finger pressing region, and output a corresponding pressure sensing signal through the at least one pressure electrode layer;

the printed circuit board is arranged below the force sensor, and is configured to carry and support the force sensor and the touch sensor; and the touch controller is mounted and fixed to the printed circuit board, is electrically connected to the touch sensor and the force sensor, and is configured to receive the touch sensing signal from the touch sensor and the pressure sensing signal from the force sensor, and determine the touch position of the finger on the touch pad and a magnitude of the pressure applied by the finger;

wherein the second touch electrode layer of the touch sensor is multiplexed by the force sensor for use as a common electrode layer; the at least one pressure electrode layer is a second pressure electrode layer located below the support structure; and the second pressure electrode layer and the common electrode layer overlap each other to form the plurality of pressure sensing capacitors;

the support structure is arranged between the second touch electrode layer and the second pressure electrode layer, and is configured to form a variable gap between the second touch electrode layer and the second pressure electrode layer, wherein a width of the variable gap is changed under the action of the pressure applied by the finger to change the pressure sensing capacitance of the finger pressing region; and the support structure comprises first support bodies, a flexible film layer, and second support bodies, the first support bodies are distributedly disposed on an upper surface of the flexible film layer, and the second support bodies are distributedly disposed on a lower surface of the flexible film layer, wherein the first support bodies are configured to support the common electrode layer, and the second support bodies are connected to the second pressure electrode layer to support the flexible film layer above the second pressure electrode layer.

2. The touch pad according to claim 1, wherein the second pressure electrode layer comprises a lower electrode sublayer, and the lower electrode sublayer is directly formed on an upper surface of the printed circuit board; or the second pressure electrode layer comprises a lower electrode sublayer and a lower substrate sublayer, wherein the lower electrode sublayer is formed on an upper surface of the lower substrate sublayer, and the lower substrate sublayer is arranged on a surface of the printed circuit board.

3. The touch pad according to claim 1, wherein the second support bodies are directly connected to the second pressure electrode layer with an adhesive glue, or the second support bodies are indirectly connected to the second pressure electrode layer through a flat layer.

4. The touch pad according to claim 1, wherein the first support bodies are first hard particles uniformly distributed in a matrix form on the upper surface of the flexible film layer, the second support bodies are second hard particles uniformly distributed in a matrix form on the lower surface of the flexible film layer, and the first support bodies and the second support bodies are arranged in a staggered manner on horizontal projection of the flexible film layer.

5. The touch pad according to claim 4, wherein the first hard particles and the second hard particles are all round particles, and have different diameters; wherein a diameter of each of the first support bodies is at least three times as long as a diameter of each of the second support bodies, or the diameter of each of the first support bodies ranges from one half to one third of the diameter of each of the second support bodies.

6. The touch pad according to claim 4, wherein the first support bodies and the second support bodies are integrally formed with the flexible film layer or are closely fixed to the upper surface and the lower surface of the flexible film layer with an adhesive glue, wherein a center of a region defined by any four adjacent second support bodies is provided with one first support body respectively, and a size of the first support body is larger than a size of one of the four adjacent second support bodies.

7. The touch pad according to claim 1, wherein the common electrode layer which is a common driving electrode layer of the touch sensor and the force sensor comprises a plurality of common driving electrodes; the first touch electrode layer comprises a plurality of touch sensing electrodes arranged above the common electrode layer, and the second pressure electrode layer comprises a plurality of pressure sensing electrodes arranged below the common electrode layer, wherein the plurality of common driving electrodes are configured to receive a driving signal from the touch controller, and the plurality of touch sensing electrodes and the plurality of pressure sensing electrodes are configured to respond to the driving signal and output the touch sensing signal and the pressure sensing signal, respectively.

8. The touch pad according to claim 7, wherein the plurality of touch sensing electrodes and the plurality of pressure sensing electrodes are configured to respond to a common driving signal sent from the touch controller at a same moment, and output the touch sensing signal and the pressure sensing signal, respectively.

9. The touch pad according to claim 7, wherein the driving signal outputted from the touch controller to the plurality of common driving electrodes comprises a touch driving signal outputted at a first moment and a pressure driving signal outputted at a second moment, the plurality of touch sensing electrodes are configured to respond to the touch driving signal and output the touch sensing signal to the touch controller, and the plurality of pressure sensing electrodes are configured to respond to the pressure driving signal, and output the pressure sensing signal to the touch controller.

10. The touch pad according to claim 1, wherein the touch pad further comprises:

an actuator mounted on a lower surface of the printed circuit board, electrically connected to the touch controller, and configured to provide vibration feedback in response to the magnitude of the pressure applied by the finger, wherein the actuator comprises four piezoelectric ceramic actuators arranged in four corner regions of the lower surface of the printed circuit board respectively, and configured to vibrate in a direction perpendicular to the printed circuit board; and a bracket configured to support the printed circuit board and mount the touch pad to an outer casing, wherein the bracket covers the lower surface of the printed circuit board and has a plurality of openings, wherein the plurality of openings is configured to accommodate the touch controller and the actuator respectively, and provide an avoidance space for the touch controller and the actuator.

11. An electronic device, comprising a displayer and the touch pad according to claim 1, wherein the touch pad is configured to, when a finger touches or presses the touch pad, detect a touch position of the finger and a magnitude of a pressure applied by the finger, and the displayer is configured to display an operation related to the touch or press of the finger.

12. A touch pad, comprising:

a touch sensing electrode layer comprising a plurality of touch sensing electrodes spaced apart from each other;

a common electrode layer arranged below the touch sensing electrode layer, and comprising a plurality of common driving electrodes spaced apart from each other, wherein a plurality of touch sensing capacitors is formed between the plurality of common driving electrodes and the plurality of touch sensing electrodes, and the plurality of touch sensing capacitors is used as touch sensors and is configured to, when a finger touches or presses the touch pad, sense a touch position of the finger and output a corresponding touch sensing signal;

a pressure sensing electrode layer arranged below the common electrode layer, and comprising a plurality of pressure sensing electrodes spaced apart from each other, wherein a plurality of pressure sensing capacitors is formed between the plurality of pressure sensing electrodes and the plurality of common driving electrodes, and the plurality of pressure sensing capacitors is used as force sensors, and is configured to detect a magnitude of a pressure applied by the finger when pressing the touch pad; and a printed circuit board configured to carry the pressure sensing electrode layer, wherein the pressure sensing electrode layer is formed on a surface of the printed circuit board;

wherein a support structure is arranged between the common electrode layer and the pressure sensing electrode layer, and the support structure is a deformable structure, and is configured to deform under an action of the pressure applied by the finger to change a pressure sensing capacitance of a finger pressing region;

the support structure comprises first support bodies, a flexible film layer, and second support bodies, wherein the first support bodies are distributedly disposed on an upper surface of the flexible film layer, and are configured to support the common electrode layer; and the second support bodies are distributedly disposed on a lower surface of the flexible film layer, and are configured to support the flexible film layer above the pressure sensing electrode layer.

13. The touch pad according to claim 12, wherein the first support bodies are first hard particles uniformly distributed in a matrix form on the upper surface of the flexible film layer, the second support bodies are second hard particles uniformly distributed in a matrix form on the lower surface of the flexible film layer, the first hard particles and the second hard particles are of different sizes, and the first support bodies and the second support bodies are arranged in a staggered manner on horizontal projection of the flexible film layer.

14. The touch pad according to claim 13, wherein a distance between a center point of one of the first support bodies and a center point of an adjacent first support body is equal to a distance between a center point of one of the second support bodies and a center point of an adjacent second support bodies.

15. The touch pad according to claim 14, wherein the touch pad further comprises a touch controller, wherein the touch controller is mounted on a lower surface of the printed circuit board, and is configured to output a driving signal to the plurality of common driving electrodes, and receive a touch sensing signal outputted from a touch sensing electrode and a pressure sensing signal outputted from a pressure sensing electrode in response to the driving signal, wherein the touch sensing signal is used to detect the touch position of the finger, and the pressure sensing signal is used to detect the magnitude of the pressure applied by the finger.

16. The touch pad according to claim 15, wherein the driving signal is a common driving signal outputted from the touch controller at a same moment, and the plurality of touch sensing electrodes and the plurality of pressure sensing electrodes are configured to respond to the common driving signal and output the touch sensing signal and the pressure sensing signal, respectively; or the driving signal outputted from the touch controller to the plurality of common driving electrodes comprises a touch driving signal outputted at a first moment and a pressure driving signal outputted at a second moment, the plurality of touch sensing electrodes are configured to respond to the touch driving signal and output the touch sensing signal to the touch controller, and the plurality of pressure sensing electrodes are configured to respond to the pressure driving signal, and output the pressure sensing signal to the touch controller.

17. The touch pad according to claim 15, wherein the touch pad further comprises:

an actuator mounted on a lower surface of the printed circuit board, electrically connected to the touch controller, and configured to provide vibration feedback in response to the magnitude of the pressure applied by the finger; and a bracket configured to support the printed circuit board and mount the touch pad to an outer casing, wherein the bracket covers the lower surface of the printed circuit board and has a plurality of openings, wherein the plurality of openings is configured to accommodate the touch controller and the actuator respectively, and provide an avoidance space for the touch controller and the actuator.

* * * * *